Dec. 12, 1933.  E. A. NELSON  1,939,221
BRAKE OPERATING MECHANISM
Filed Oct. 2, 1931
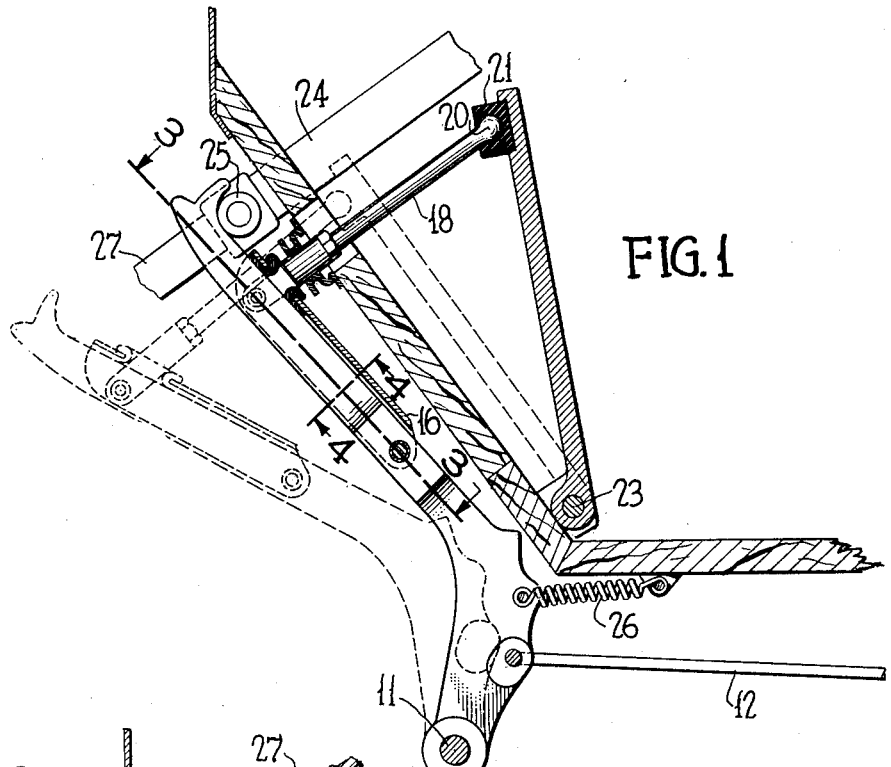
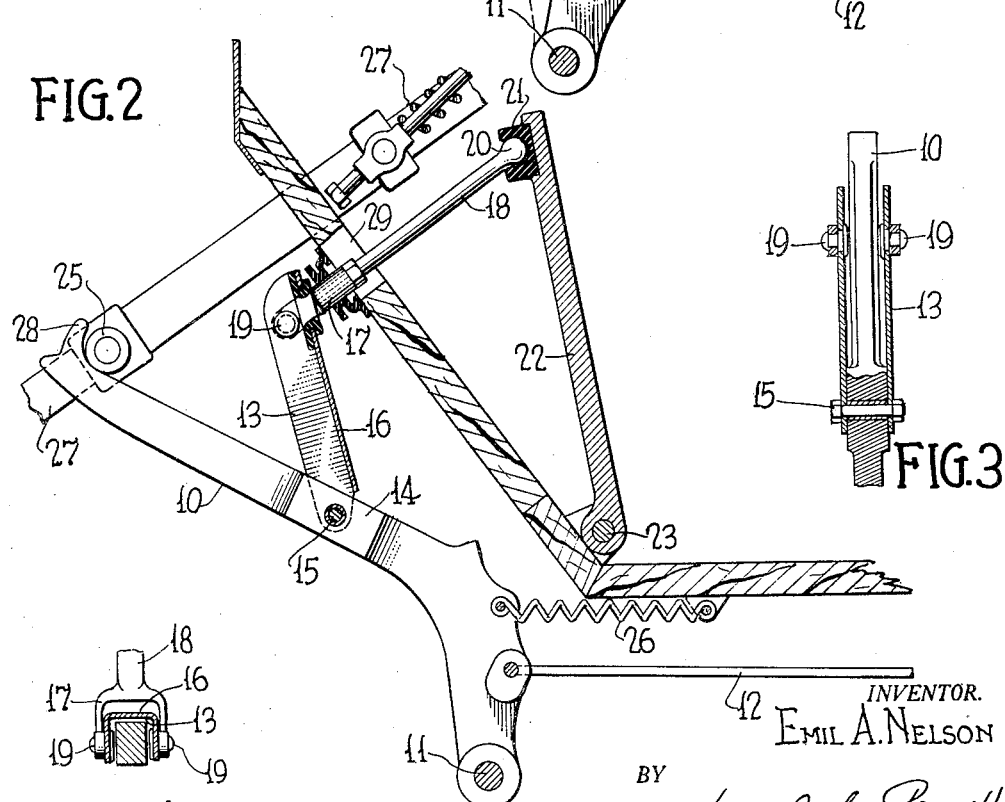
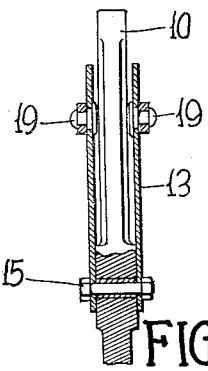
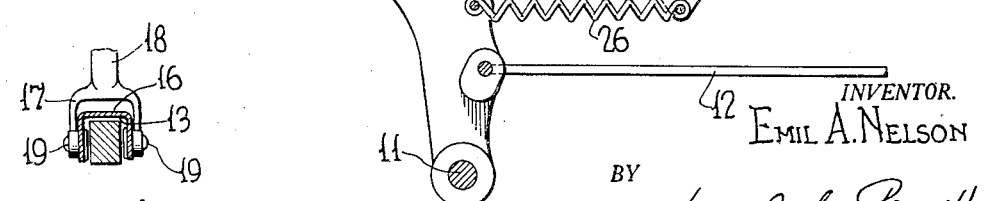
INVENTOR.
EMIL A. NELSON
BY
ATTORNEYS Patented Dec. 12, 1933

1,939,221

UNITED STATES PATENT OFFICE 1,939,221

BRAKE OPERATING MECHANISM

Emil A. Nelson, Detroit, Mich.

Application October 2, 1931. Serial No. 566,512

2 Claims. (Cl. 74—81)

My invention relates to the art of brake actuators. It has been my object to devise a brake actuating system for vehicles affording connections from service and emergency brake operating levers to said brakes which involve a very simple mechanism including a small number of parts and which are certain and effective in operation. A further object has been to devise a system involving a single main actuating lever interconnected with the wheel brakes of the vehicle and actuated by service and emergency brake levers which may be independently operated without interference with each other.

A still further object of my invention has been to devise a braking system which may be very readily assembled and affords no obstruction to the assembly of the body of the vehicle upon the chassis thereof. Still further objects and advantages will be obvious from a reading of the sub-joined specification in the light of the attached drawing, in which, Fig. 1 is a longitudinal section through my brake actuating mechanism and operating lever.

Fig. 2 is a view similar to Fig. 1 illustrating the position of the parts when the emergency brake lever only is operated.

Fig. 3 is a section on the line 3—3 of Fig. 1, and

Fig. 4 is a section on the line 4—4 of Fig. 1.

Referring to the drawing by reference characters, the numeral 10 indicates the main actuating lever of my braking system which is pivoted at 11 and interconnected through a link 12 with an oscillating cross shaft, which, through its oscillation controls the actuation of both the front and rear wheel brakes. My system involves the use of but a single set of brake shoes and these shoes are operated from the lever 10 through both the emergency and the service brake operating levers, the emergency brake operating lever, as is common in such systems, affording an excess of travel of the brake actuating linkage over that obtained from the depression of the service brake.

In accordance with my invention I provide brake actuating mechanism for both the emergency and service operating levers each affording connections with the lever 10 capable of effecting the depression of this lever, but neither of which is necessarily depressed with the lever 10. In this way I am able to effect an actuation of the brakes by the use of either the service or emergency operating lever without interfering with the position of the other.

The service brake operating lever is interconnected with the main actuating lever 10 through a U-shaped lever 13 which is pivoted to a laterally thickened portion 14 of the lever 10, as indicated at 15. The base 16 of the U-shaped lever overlies the lever 10. Accordingly, when the lever 13 is depressed its base 16 forces the lever 10 downwardly. On the other hand, when the lever 10 is depressed by other means such as the emergency brake operating mechanism, the lever 13 is not carried bodily downwardly. Under these circumstances it simply pivots about the pin 15 as indicated in Fig. 2. A clevis 17 is connected through its opposite arms to the arms of the U-shaped lever 13, as indicated at 19 and is adjustably connected on its opposite end to a straight link 18 which is provided on its end opposite the lever 13 with a ball shaped portion 20 adapted to fit in a rubber socket 21 which is moulded to the under side of the upper end of an operating pedal 22 which is pivoted at its lower end at 23. The link 18 passes through the floor board thus interconnecting the pedal 22, which lies above the floor board with the lever 13 for operating the service brake.

The emergency brake is controlled through a reciprocable sleeve 24 which is slidably mounted upon the steering post 27 and is actuated by any suitable mechanism such as that disclosed in my co-pending application Serial No. 566,513 filed of even date herewith. The sleeve 24 carries at its lower end a roller 25 which rides upon the upper surface of the lever 10 adjacent the end of that lever remote from its fulcrum 11. The lever 10 is turned upwardly adjacent its upper end, as indicated at 28, and serves as a guide and abutment for the operating roller 25 as the sleeve 24 is depressed.

It will be obvious from the above description that the service brake may be depressed to actuate the lever 10 without effecting the position of the emergency brake operating mechanism. Under such circumstances the roller 25 remains in the position illustrated in full lines in Fig. 1 while the actuating lever 10 assumes the position indicated therein in dotted lines. Thus, when the emergency brake lever only is actuated the parts assume the position illustrated in Fig. 2 without interfering with the normal position of the foot lever and likewise, when the foot lever alone is actuated the parts assume the dotted line position of Fig. 1 without interfering with the position of the emergency brake operating mechanism. A pull back spring is connected to the lever 10 as indicated at 26, and, together with the inherent resiliency of other parts of the braking system, effects a return of the lever 10 to the position illustrated in full lines in Fig. 1 after it is depressed by either the service or emergency brake operating lever.

It will also be obvious from a consideration of the drawing that the lever 10 and associated mechanism can be assembled with the chassis of the vehicle and the link 18 thrust through the opening 29 in the floor board after the assembly of the body, including the floor board upon the chassis. The parts may thus be very simply connected together and afford no obstruction to the assembly of the body upon the chassis. When similar connections are employed for the accelerator and clutch pedal the problem of the assembly of the body of the vehicle upon the chassis is much simplified.

Modifications will be obvious to those skilled in the art and I do not therefore wish to be limited except by the scope of my sub-joined claims as interpreted in the light of the generic spirit of my invention.

What is claimed is:

1. The combination with a pivotally mounted actuating lever for a vehicle braking system, of a reciprocable member provided with a projecting roller adapted to overlie a portion of said lever and effect an actuation thereof upon a movement of said member in one direction, a second lever pivotally connected to said actuating lever having a portion overlying the same and connections from said second lever to an operating member.

2. The combination of a vehicle having a floor board, of a support, a brake operating lever disposed below the floor board and pivoted to said support, a reciprocable member engageable with said operating lever, means for operating the member to actuate said lever upon reciprocation of said member in one direction only, a second lever pivotally connected to said first-named lever and having a portion adapted to overlie a part of said first named lever remote from its pivotal connection to said support, a brake operating lever above the floor board and a link pivotally interconnecting said second-named lever with said last-named lever.

EMIL A. NELSON.